Jan. 2, 1945. R. R. RIDDLE 2,366,571
ROTARY TILLING HOUSING PROTECTOR
Filed May 8, 1943

INVENTOR.
Raymond R. Riddle
BY
Duell, Kane and Smoot
ATTORNEYS

Patented Jan. 2, 1945

2,366,571

UNITED STATES PATENT OFFICE 2,366,571

ROTARY TILLING HOUSING PROTECTOR

Raymond R. Riddle, North Wilbraham, Mass., assignor to Rototiller, Inc., Troy, N. Y., a corporation of Delaware Application May 8, 1943, Serial No. 486,143

5 Claims. (Cl. 97—212)

This invention relates to improvements in road making and agricultural machines especially of the type provided with rotary tools or tines.

In machines of this construction a number of tilling tools or tines are mounted on a shaft so that they may be rotatably driven through the ground. These machines are frequently used in preparing ground having considerable weeds, roots and foreign matter such as wire, etc., and considerable difficulty has been encountered with the weeds, roots and other matter winding about the shaft and tools and working into contact with the shaft housing. As a result of this material being in contact with the shaft housing, a great deal of frictional wear results causing not only an over-heating of the housing and adjoining parts, but also a serious loss of power due to the jamming action. Frequent stopping to clear away the wound material has resulted and, in addition, damage to the housing and bearings frequently results requiring repairs which necessitate long periods of lay-up of the machine.

The present invention relates to a structure for eliminating the effects of this wind-up of roots, grass, trash and other substances and, therefore, eliminates stopping during use and also adds greatly to the life of the machine as well as saving considerable power in the operation thereof.

Essentially this invention comprises the use of a protective shield rotating with the shaft and positioned so that foreign matter cannot come into contact with the housing. This shield is shaped so as to throw off dirt and other substances so that they do not come into contact with the bearing while additionally acting as a dust shield.

Figure 2:
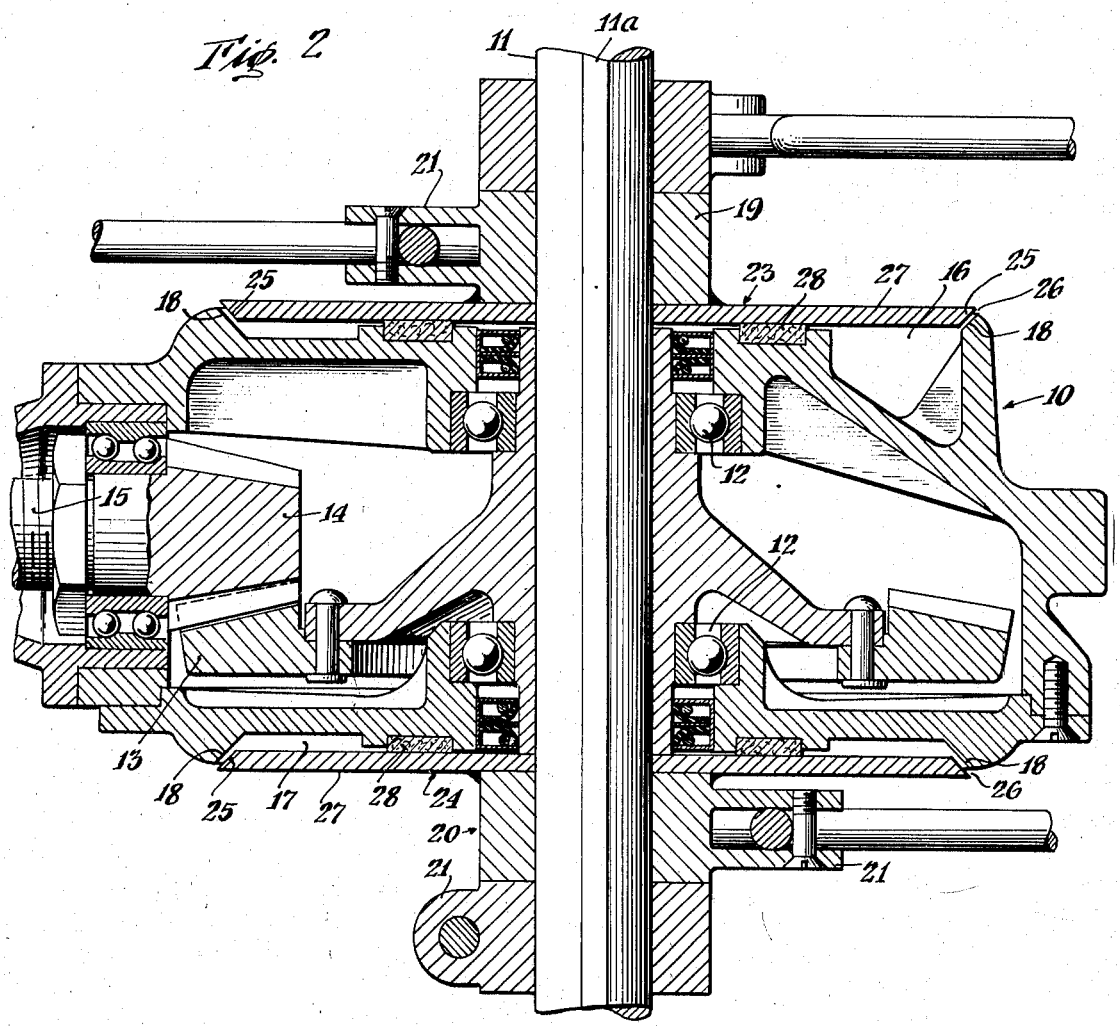
Figure 1:
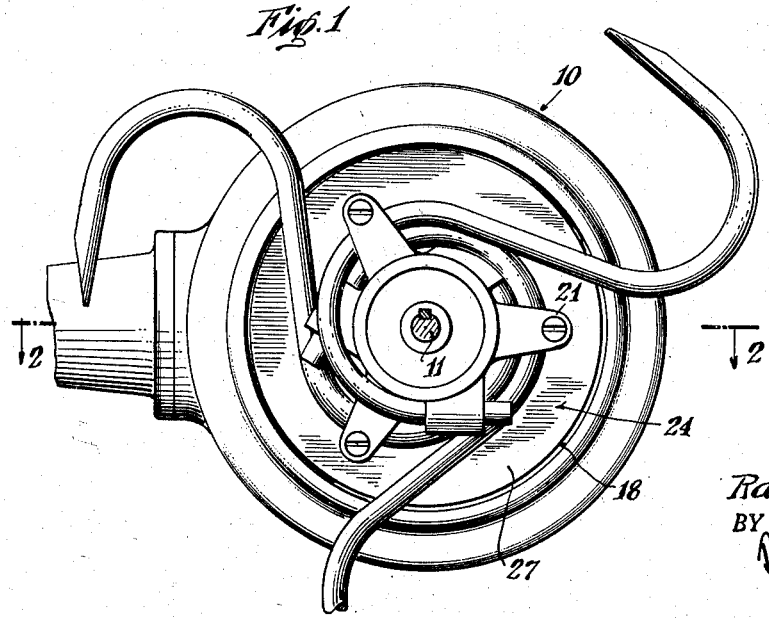

The effectiveness and simplicity of the device which accomplishes these desirable purposes will be readily apparent by reference to the accompanying drawing in which:

Fig. 1 is an end view of the portion of the machine embodying my invention while Fig. 2 is a cross section taken along the line 2—2 of Fig. 1 and looking in the direction of the arrows.

As illustrated, the invention is applied to what might be termed the rear end of a rotary tilling unit, but it will be readily apparent that the invention may be applicable to varying forms of rotary structures in which similar difficulties are encountered.

The rear end housing 10 supports the transversely mounted rotatable tool carrying shaft 11 generally supported by bearings 12 and connected for rotation by means of ring gear 13 and bevel gear 14 to shaft 15 which in turn is connected to a source of power not shown.

Housing 10 is provided on the sides through which tool shaft 11 projects, with circular recesses 16 and 17 concentrically disposed about the tool shaft and preferably provided on their circumferences with bevelled or conical surfaces 18 extending outwardly and away from the housing. These recesses and the surfaces 18 may be cast integral with the housing as shown, or if desired, may be furnished by welding or otherwise securing flanges to the housing.

Adapted for mounting on the shaft 11 and preferably keyed thereto by means of key way 11a is a group of tool holders only two of which are shown. The innermost of these holders 19 and 20, which are adapted to be placed closest to the housing 10, are provided with a suitable tool mounting means 21 for mounting the tines or tools and are provided adjacent the housing with rotating protective shields 23 and 24 secured respectively to the tool holders 19 and 20 as, for example, by welding.

It is, of course, to be pointed out that the essential object is to rotate the shields 23 and 24 with the shaft 11 and, if desired, this may be done by keying or otherwise securing said shields to the shaft. Preferably, and as shown, the shield is permanently affixed to a tool mounting. This prevents foreign matter from dropping between the tool mount and the shield and then working its way toward the shaft bearings. Furthermore, the tool mounting not only functions as a hub for the shield which otherwise would have only a comparatively small area in contact with the shaft, and thus serves to maintain the shield perpendicular to the shaft, but also permits the tool holder and tools to be placed very much closer to the housing 10 than would be possible if the shield had a separate hub thereon. The necessity of designing the housing as narrow as possible and positioning the adjacent tools as closely as possible to the sides thereof is obvious in order to minimize the width of the ground between these tools which is not worked.

The shields, circular in shape, are preferably constructed of a strong metal or other shock resisting substance and are preferably of a gauge permitting them to be placed within the recesses 16 and 17 and of a diameter slightly smaller than the diameter of the recesses. The circumferential edges of these shields are preferably outwardly bevelled or conical as illustrated at 25 thus presenting surfaces parallel to the edges 18 of the recesses and slightly spaced therefrom thereby providing the channels or clearances 26. The outermost face 27 of the shields preferably extends very slightly beyond the outermost edges of the housing surfaces 18. Consequently, and as a result thereof, sand, dirt and other substances which are being moved away from the shaft under centrifugal force, fly off or are discarded without in any way touching the housing. However, the circumferential edge of the shield is substantially protected from rocks or blows by the flanges or surfaces 18 which tend to ward off such foreign material.

Oil seals 28 made of felt or other suitable material are positioned on the housing and in contact with the shields at a suitable distance from the shaft. These serve as supports for the revolving shield and prevent any dust or other material which may find its way into the recesses from dropping into contact with the shaft.

It will be readily understood that due to the provision of the channels 26, dust, stones or other material will drop to the bottom of the recesses and, due to the slanting of the channels, fall out. It will thus be apparent that due to my invention foreign matter is entirely kept away from the stationary housing and thus previous difficulties encountered therewith have been completely overcome.

I desire it understood that the drawing illustrates only one application of my invention and is not to be taken in a limiting sense except as required by the appended claims.

I claim:

1. In a rotary tilling machine, the combination with a housing, of a driven shaft extending transversely of said machine through said housing and having mountings for tilling tools secured in substantially fixed relation thereto at each side of said housing; the exterior of each side of said housing having a shallow, circular depression therein of substantial diameter concentric with said shaft; and a comparatively thin, circular plate secured to said shaft in substantially fixed relation thereto and positioned in and substantially coextensive with each of said depressions; whereby the overall width of said housing is maintained substantially the same throughout, and said plates will function to prevent friction losses due to grass and like materials which become wound about said shaft adjacent said housing and which, otherwise, would rub against the sides of said housing when said machine is in operation.

2. In a rotary tilling machine, the combination with a housing, of a driven shaft extending transversely of said machine through said housing; the exterior of each side of said housing having a shallow, circular depression therein of substantial diameter concentric with said shaft; of a tool mounting secured to said shaft in substantially fixed relation thereto on each side of said housing and having a comparatively thin, circular plate secured to said mounting; said plates being positioned in and substantially coextensive with the adjacent depressions in said housing; whereby the overall width of said housing is maintained substantially the same throughout, and said plates will function to prevent friction losses due to grass and like materials which become wound about said shaft adjacent said housing and which, otherwise, would rub against the sides of said housing when said machine is in operation.

3. The structure set forth in claim 1 in which the outer edges of said depressions and said plates are substantially complementary conical surfaces tapering outwardly from said housing; whereby foreign matter entering the space between said plate and said casing will be discharged at the bottom of said plate.

4. The structure set forth in claim 2 in which the outer edges of said depressions and said plates are substantially complementary conical surfaces tapering outwardly from said housing; whereby foreign matter entering the space between said plate and said casing will be discharged at the bottom of said plate.

5. A housing protector for a rotary tiller comprising the combination with a comparatively thin circular plate having a central hub thereon and provided with an axial passage and keyway therethrough adapting said hub and plate to be rigidly secured to a driving shaft extending through said housing with said plate adjacent said housing, of means for mounting a tilling tool on said hub.

RAYMOND R. RIDDLE.